(12) United States Patent
Reynolds et al.

(10) Patent No.: US 10,002,119 B2
(45) Date of Patent: Jun. 19, 2018

(54) AGGREGATION AND TRACKED CHANGES OF INFORMATION FROM MULTIPLE DATABASES USING UNIQUE IDENTIFICATION METHOD

(71) Applicant: NORTHROP GRUMMAN SYSTEMS CORPORATION, Falls Church, VA (US)

(72) Inventors: Taryn Reynolds, Hawthorne, CA (US); Matthew R. Ward, Mercer Island, WA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 469 days.

(21) Appl. No.: 14/590,726

(22) Filed: Jan. 6, 2015

(65) Prior Publication Data

US 2016/0196255 A1    Jul. 7, 2016

(51) Int. Cl.
| | | |
|---|---|---|
| *G06F 15/173* | (2006.01) | |
| *G06F 17/24* | (2006.01) | |
| *G06F 3/0482* | (2013.01) | |
| *G06F 12/00* | (2006.01) | |

(52) U.S. Cl.
CPC .......... *G06F 17/246* (2013.01); *G06F 3/0482* (2013.01); *G06F 17/24* (2013.01)

(58) Field of Classification Search
CPC ........ G06F 15/173; G06F 17/30; G06F 17/00; G06F 17/246; G06F 3/0482; G06F 17/24
USPC .......................................... 715/212; 709/225
See application file for complete search history.

(56) References Cited

U.S. PATENT DOCUMENTS

| | | | |
|---|---|---|---|
| 6,370,562 B2 | 4/2002 | Page et al. | |
| 6,714,979 B1* | 3/2004 | Brandt | H04L 63/166 |
| | | | 707/999.003 |
| 6,735,741 B1 | 5/2004 | Pannu | |
| 6,834,276 B1 | 12/2004 | Jensen et al. | |
| 6,901,446 B2* | 5/2005 | Chellis | G06F 9/50 |
| | | | 709/226 |
| 7,100,195 B1* | 8/2006 | Underwood | G06F 9/4443 |
| | | | 707/999.009 |
| 7,209,911 B2 | 4/2007 | Boothby et al. | |
| 7,263,537 B1 | 8/2007 | Lin et al. | |
| 7,401,064 B1* | 7/2008 | Arone | G06F 17/30557 |
| 7,650,335 B2 | 1/2010 | Leetaru et al. | |
| 7,721,303 B2 | 5/2010 | Alves de Moura et al. | |

(Continued)

OTHER PUBLICATIONS

ActiveReports 6 User Guide, copyright of GrapeCity, Inc., captured by www.archive.org on Oct. 13, 2011.*

(Continued)

*Primary Examiner* — Cesar Paula
*Assistant Examiner* — Jian Huang
(74) *Attorney, Agent, or Firm* — John A. Miller; Shumaker, Loop & Kendrick, LLP

(57) ABSTRACT

A system and method for combining data from multiple reports into a single spreadsheet. The system and method include downloading at least two reports to a computing device and opening the at least two reports using the computing device. The system and method further include creating unique identifiers for each report and merging the at least two reports by mapping and combining relevant data into the single spreadsheet such that each line item in the spreadsheet includes the relevant data from the at least two reports.

20 Claims, 8 Drawing Sheets

(56) References Cited

U.S. PATENT DOCUMENTS

| | | | |
|---|---|---|---|
| 7,797,276 B1 | 9/2010 | Yang | |
| 8,027,969 B2 | 9/2011 | Peh et al. | |
| 8,117,153 B2 | 2/2012 | Cattell et al. | |
| 8,381,208 B2 | 2/2013 | Burke et al. | |
| 8,484,206 B2* | 7/2013 | Schmidt | G06Q 10/10 705/7.11 |
| 8,489,543 B2 | 7/2013 | Taylor et al. | |
| 8,606,260 B2* | 12/2013 | Chatterjee | H04W 24/08 370/241 |
| 8,868,484 B2* | 10/2014 | Aggarwal | G06F 17/30592 707/602 |
| 2002/0052801 A1* | 5/2002 | Norton | G06Q 30/06 705/26.43 |
| 2005/0034058 A1 | 2/2005 | Milles et al. | |
| 2005/0182773 A1* | 8/2005 | Feinsmith | G06Q 10/10 |
| 2005/0234886 A1* | 10/2005 | Mohraz | G06F 8/38 |
| 2007/0027868 A1 | 2/2007 | Mohammed | |
| 2008/0288448 A1* | 11/2008 | Agredano | G06Q 30/00 |
| 2009/0055267 A1* | 2/2009 | Roker | G06F 17/3089 705/14.1 |
| 2010/0049603 A1* | 2/2010 | Peterson | G06Q 30/02 705/14.45 |
| 2012/0197907 A1 | 8/2012 | Malyshev et al. | |
| 2013/0103951 A1 | 4/2013 | Klevan et al. | |
| 2013/0198233 A1 | 8/2013 | Jacobson et al. | |

OTHER PUBLICATIONS

Microsoft Excel 2013, released on Jan. 29, 2013, MSExcel2013_screen_shots.pdf.*

Range.Consolidate Method (Excel), 1 pg. URL:https://msdn.microsoft.com/en-us/library/office/ff839594.aspx. Web Jun. 17, 2016.

Excel—Data Consolidation, Excelmate, All things Excel with a dash of other desktop application stuff, dated Feb. 21, 2013 3pgs. URL:https://excelmate.wordpress.com/2013/02/21/excel-data-consolidation/ Web Jun. 17, 2016.

Dodge, Mark, Inside Out—Excel 2013, Microsoft Press, A Division of Microsoft Corporation, 2003, pp. 75-83, 100, 276-283, 308, 454, 809, 843 and Chap. 28.

Kingsland III, Lawrence C. et al. "The NLM Gateway: a Metasearch Engine for Disparate Resources" MEDINFO 2004, Amsterdam, IOS Press, pp. 52-56.

Yoder, Joseph W. et al. "Connecting Business Objects to Relational Databases" pp. 1-31.

* cited by examiner

AGGREGATION AND TRACKED CHANGES OF INFORMATION FROM MULTIPLE DATABASES USING UNIQUE IDENTIFICATION METHOD

GOVERNMENT CONTRACT

This invention was made with Government support under Contract F33657-99-D-0028 awarded by the United States Air Force. The Government has certain rights in this invention.

BACKGROUND

1. Field

This invention relates generally to a system and method for efficiently turning a large volume of data into actionable information and, more particularly, to a custom computational tool that combines procurement information from multiple databases into a single user friendly interface that provides automated status emails, material from estimate-to-complete information, and metrics data.

2. Discussion

Material requirements planning (MRP) is a production planning, scheduling and inventory control system used to manage manufacturing processes, projects and similar activities. The typical objectives of an MRP system is to: (1) ensure materials are available for production and products are available for delivery to customers; (2) maintain the lowest possible material and product levels on site and/or in storage; and (3) plan manufacturing activities, delivery schedules, and purchasing activities. A commonly used resource is a sourcing and procurement system (SAP) for at least some of the MRP system. For a large MRP system, it is typical that several reports are required to put together the big picture of a company's MRP system. For example, an SAP may have three or more reports, where each report contributes different information, where all of the information is necessary for the MRP.

Typically, a system user must download each report that is necessary for the MRP, and then the user must combine the pertinent information from each report manually to provide the MRP with a complete picture of all of the useful data. Each report may take 30 minutes to download, and to combine and correlate the downloaded data may take approximately 15-40 hours. Thus, by the time the data has all been processed, at least some of the information contained therein may be outdated. Therefore, there is a need in the art for a way to quickly turn a large volume of data from multiple sources into cohesive, actionable information.

DETAILED DESCRIPTION OF THE EMBODIMENTS

The following discussion of the embodiments of the invention directed to a system and method for efficiently turning a large volume of data into actionable information is merely exemplary in nature, and is in no way intended to limit the invention or its applications or uses. For example, while procurement data is used in the description herein, it is to be understood that any type of data that needs to be combined from different reports are within the scope of the present invention.

Figure 1:
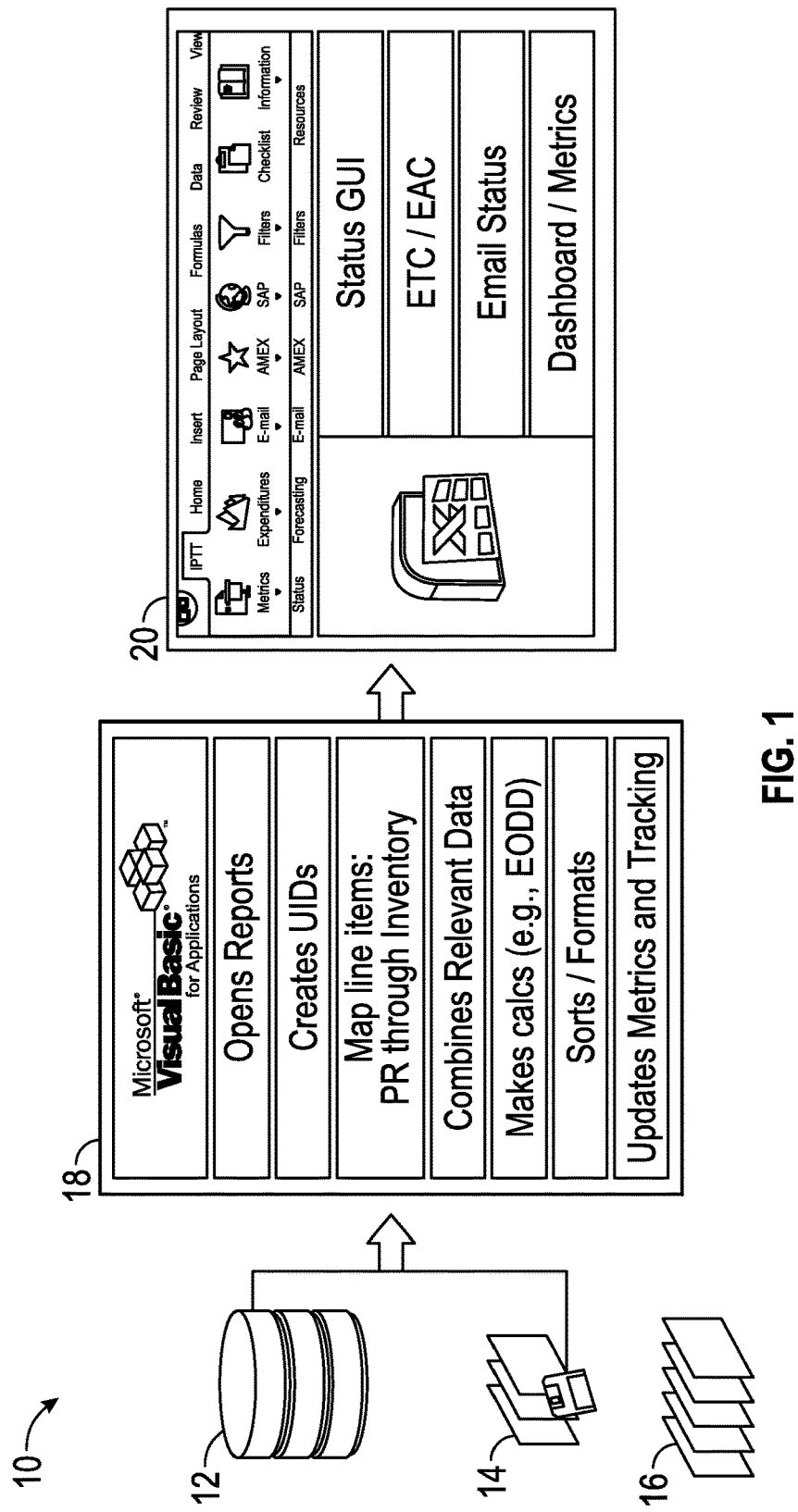
FIG. 1 is an illustration of a material tracking system that automatically combines procurement information from multiple databases/sources.

FIG. 1 is an illustration of a material tracking system 10 that is capable of automatically combining procurement information from multiple databases/sources into a single interface. For example, information may come from at least one electronic procurement system (EPS) 12 such as an EPS managed on an Oracle™ database. Information may also come from at least one SAP report 14. For example, demand reports, inventory availability reports, inspection reports, critical reports, other reports, and PR header comments reports may be part of the SAP reports 14. Information from reports for the system may also include at least one additional report, for example, one or more business warehouse reports or parts approved supplier lists, also known as Enterprise Central Component (ECC) reports 16. For example, business warehouse reports may include daily total requisition reports, daily PO short text inquiry reports, and/or open purchase order quantity by plant reports.

Once the desired reports are determined and downloaded, the desired reports are opened in a suitable code language, such as, for example, Visual Basic™, SQL, etc., at box 18. The reports from the boxes 12-16 may be downloaded manually or may be automatically downloaded as described in more detail below. At the box 18, using the code language, a unique identification (UID) or fingerprint ID is created for each report, as is described in more detail below. By creating a UID for each report, the line items that are the same in the various reports may be mapped as line items such that relevant data is combined, calculations are made, data sorts/formats are created and metrics and tracking are updated by the code language at the box 18. Next, the data is displayed in a single spreadsheet, for example, an Excel spreadsheet, at box 20. The spreadsheet used at the box 20 provides various user friendly data displays, described in more detail below. For example, status graphic user interfaces (GUIs), estimate to complete/estimate at completion (ETC/EAC), email status and dashboard/metrics are available to a user.

Figure 2:
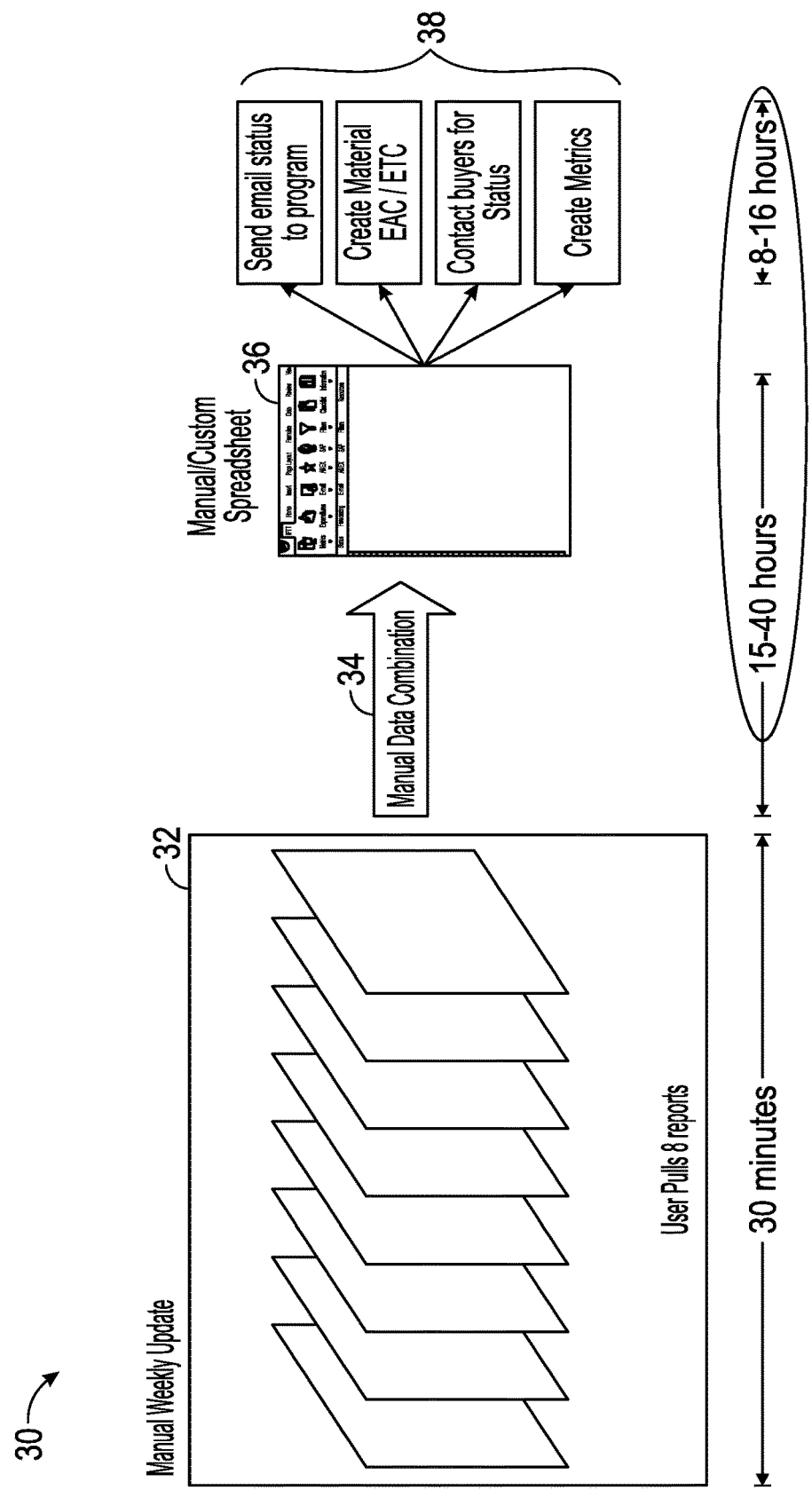
FIG. 2 is an illustration of a known system that manually combines data.

As stated above, known methods of manually combining data from reports is time-consuming and the results are not as user-friendly as those that may be achieved by the system 10. FIG. 2 is an illustration of a known manual system 30 that manually combines data from eight different reports using the system 30. Using the manual system 30, a user downloads data from eight different reports at box 32. The amount of time required to download the eight reports is approximately 30 minutes. Next, using the manual system 30, a user manually combines the data from the eight reports at box 34 and manually creates a custom spreadsheet at box 36. The time it takes to perform the tasks of the boxes 34 and 36 is a total time of approximately 15-40 hours. Next, using the manual system 30, a user sends emails regarding status updates, creates material ETC/EACs, contacts buyers for status updates and creates metrics at a box 38. The tasks performed at the box 38 take approximately 8-16 hours to complete. Thus, a total of approximately 24-57 hours are required to use the manual system 30. The time required is so long that the system 30 may be used only one or two times per week. By the time the update is complete, some of the information contained therein may be outdated. Thus, a faster system is needed to more accurately manage the MRP.

Figure 3:
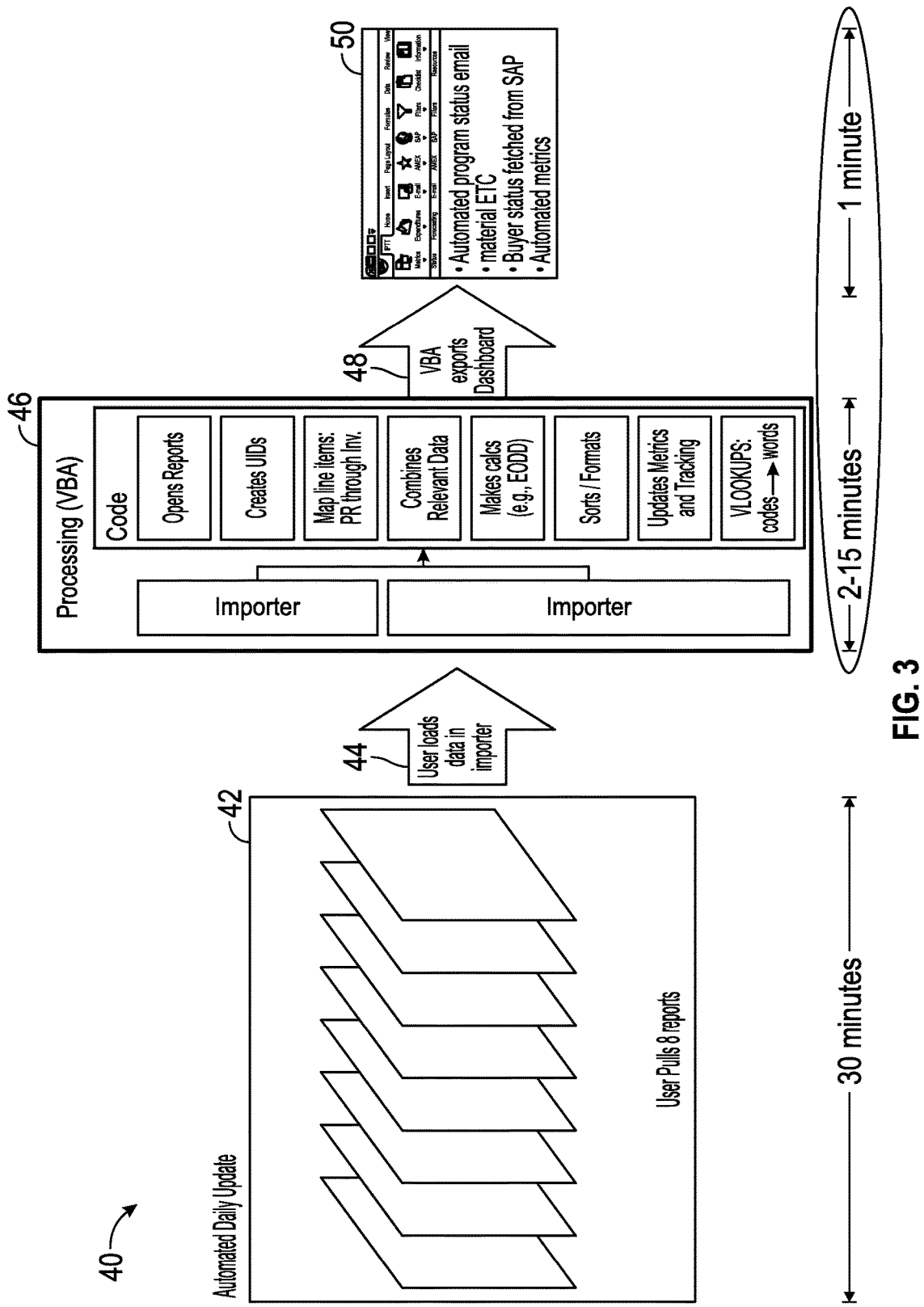
FIG. 3 is an illustration of a system that uses a computing device to automatically combines the same data as the known manual system.

FIG. 3 is an illustration of a system 40 that automatically combines the same data that is manually processed in the system 30 above. Using the automated system 40, the user manually downloads the eight reports at box 42 in the same way as the manual system 30. However, this portion may be automated as is described in detail below. Once the eight reports are manually downloaded at the box 42, a user loads data from the eight reports into an importer of a computer at box 44. Using an appropriate language, such as VisualBasic™, an algorithm of a processor of the system 40 opens the imported reports from the box 44, creates unique IDs (UIDs), and combines and processes the imported data at box 46. The appropriate coding language, Visual Basic™ in this example, exports the combined and processed data at box 48 to an appropriate visual display, such as an Excel spreadsheet, at box 50. While the time it takes to download the eight reports at the box 42 is the same as at the box 32 of FIG. 2 (because it is manual in this example) the remaining processing of the eight downloaded reports takes only approximately 3-16 minutes total using the algorithm of the system 40. In the manual system 30 this portion of processing takes 24-57 hours to perform. Thus, using the automated system 40 is significantly faster and therefore may be performed more frequently, thereby eliminating or reducing the problem of data becoming outdated before processing is complete. Furthermore, additional displays may be used as part of the algorithm that are not part of the manual system 30.

Figure 4:
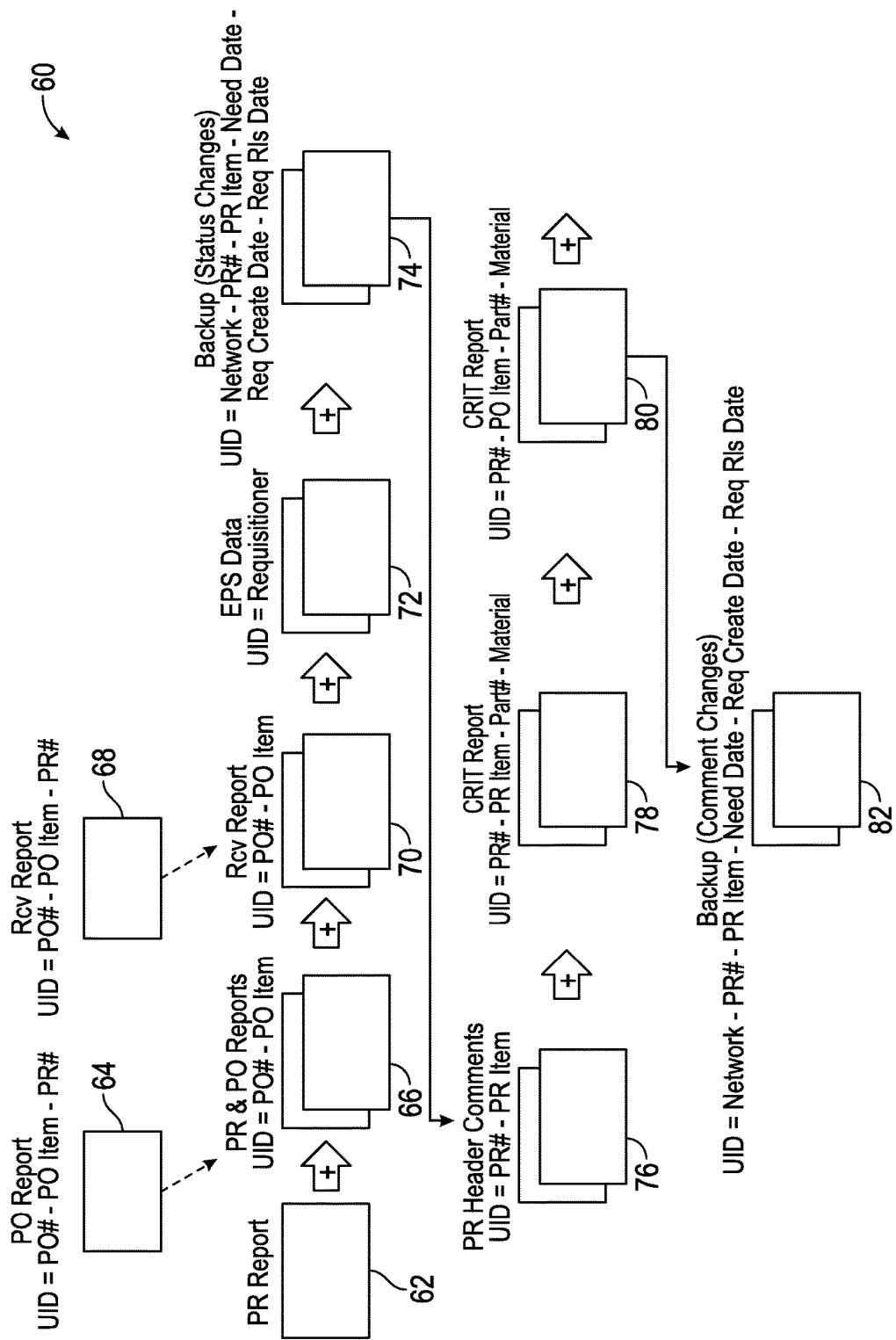
FIG. 4 is an illustration of an overview of an exemplary process of a computing device for creating unique identifiers for each report.

FIG. 4 illustrates an overview of an exemplary process 60 of a computing device for creating unique identifiers (UIDs), i.e., fingerprint IDs, for each report and/or each report that is to be merged with an original/master report such that data from various reports may be combined in a cohesive way. The specific reports illustrated in the process 60 are merely exemplary in nature, as any suitable combination of reports may be used to correlate desired data using the UIDs.

Using a suitable coding language, such as Visual Basic™, and starting with a procurement (PR) report at box 62, the process 60 creates a UID for a purchase order (PO) report at box 64, where the UID is a unique identifier that includes, for example, a PO number, a PO item and a PR number, is assigned for each line item in the PO is provided a UID. One PO or many POs may be merged at the box 64 by giving each PO a UID. When data is the same among reports, the data is combined such that overall totals/quantities are provided.

The data from the PO report at the box 64 is merged with the PR report at the box 62 to create a combined PR and PO report at the box 66 with updated UIDs. Next, a receive report that has been downloaded and opened is assigned a UID that is based on, for example, PO number, PO item, and PR number at box 68. The receive report with the unique identifier is merged with the PR and PO report from the box 66 at box 70. Thus, at box 70 a merged report that includes the PR and PO reports and also the receive report is created.

At box 72 electronic procurement system (EPS) data from a system managed on an Oracle database is assigned a UID using, for example, requisitioners and the data is flagged to alert that the data has originated from a different system, i.e., an Oracle database. After the data is merged with the combined report of the box 70 at the box 72, meaning all the data is aligned in the appropriate line item arrangement, a backup is performed and a UID that includes, for example, network, PR number, PR item, a need date, requisition create date and requisition release date is created at box 74. In this way, a large fingerprint is created for the backup at the box 74 that includes information that is not likely to change over time. Delivery dates, for example, are not used because delivery dates often change. It is important at this stage to create a UID using fields, i.e., information, not likely to change to ensure accurate tracking and to ensure that any changes are captured, for example, changes in delivery date, part number, quantity, and/or vendor changes.

A UID that includes a PR number and a PR item is created for PR header comments at box 76 so that PR header comments are matched to the appropriate existing line item from the merged and backed up report of the box 74. This is useful because it saves time that would have been wasted on emails, phone calls, and even meetings simply for part status. Merging this information directly from the buyer allows the users to get the status they need in any easy to read format. Essentially, each UID adds one or more columns to reports that are merged such that the line items are expanded in the spreadsheet to contain a wealth of information that is easily searchable, as the columns are populated with information from the reports. A section within the code of the system 10 keeps track of any changes in dates and/or status for each line item. Overlap in other parameters will be rewritten with the most current information.

After the PR header comments are merged with the data from the previous reports at the box 76, CRIT reports, i.e., reports regarding critical or urgent materials, may be merged into the previous reports at boxes 78 and 80. For example, a first CRIT report at the box 78 may be provided a UID and merged, and a second CRIT report at the box 80 may be provided a UID and merged. The UID for the first CRIT report may use, for example, PR number, PR item, part number and material. The UID for the second CRIT report may use, for example, PO number, PO item, part number and material.

Once the second CRIT report is merged at the box 80, a backup is created at box 82 that is given a UID using, for example, network, PR number, PR item, need date, requisition create date and requisition release date. As with the backup created at the box 74, the backup created at the box 82 is created to check for status changes, wherein a status change is flagged. If a status change has occurred, the spreadsheet is updated and is noted via a pop-up message at the end of the backup creation process.

The fields of the spreadsheet are populated with information from the reports such that the desired information is readily available and organized in a logical format. To track parts, for example, fields are filled with information that makes sense for tracking parts. For a part the fields may be filled such that it can be determined who purchased, quantity, price, vendor, etc. The number of fields included for each part is unlimited. For example, 50 or more columns may be part of each line item.

Because 50 columns may be difficult to read in a spreadsheet, even though the data has been conveniently merged into a single spreadsheet, on a single line, a further aspect of the present invention is that cells in the spreadsheet may be double-clicked on to generate a pop-up that illustrates some or all of the information from the 50 columns into one, easy to read, pop-up display, i.e., a graphic user interface (GUI)

display. For example, if a user double-clicks on a cell of the spreadsheet that lists the name of a vendor, a pop-up screen that display a vendor summary that may include vendor history information, cost the vendor charges, if that vendor has been late on past orders, etc. In another example, clicking on a cell that lists an SAP item summary in a GUI may pop-up may be generated upon double clicking the SAP item. Thus, information contained in a pop-up screen may include information from the columns and/or line item, additional information not included in the columns, or a combination thereof. Any combination of information from reports that are part of the system 10 discussed above may be used to populate a pop-up display that is generated from double-clicking on a cell in the spreadsheet, or from using a drop down menu of the spreadsheet as is described in more detail below.

Figure 5:
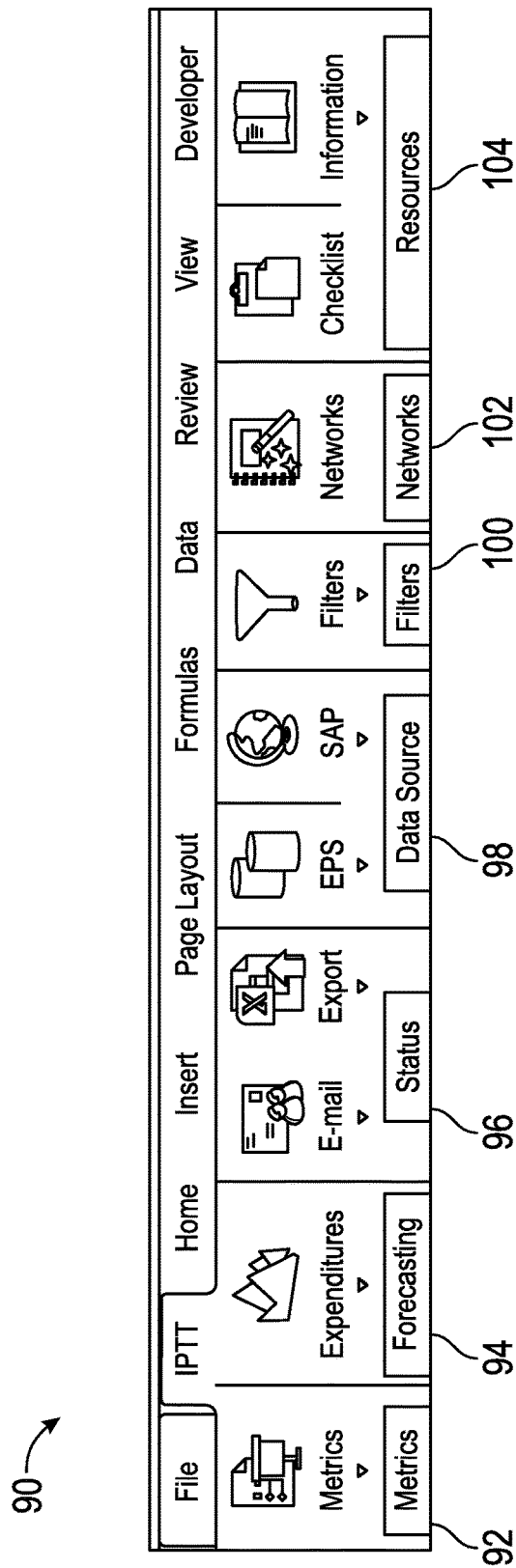
FIG. 5 is an illustration of a custom ribbon of an electronic spreadsheet.

FIG. 5 illustrates a custom ribbon 90 of the spreadsheet of the merged data shown in the box 20 of the system 10. The custom ribbon 90 is designed to provide a convenient way to view data and update data in a logical way. The custom ribbon 90 is merely exemplary, as other suitable ribbon arrangements may be used. In the ribbon 90, a metrics drop down menu 92 is provided that is capable of displaying various status displays. For example, the metrics drop down menu 92 may display/filter overall procurement and metrics information, display/filter item status for all associated networks, and export metrics information into programs such as Power Point such that one click of the button incorporates the metrics data into a presentation.

A forecasting drop down menu 94 is also included in the ribbon 90 that updates budget/actuals and forecasting information. The forecasting menu 94 is capable of allowing a user to export forecasting data into a new worksheet that includes charting capabilities for comparing forecasting to actual numbers and to budgeted numbers. The forecasting menu 94 also is capable of creating charts for monthly costs expenditures.

A status drop down menu 96 is capable of automatically generating an email status of items from either all or selected program networks and status', and may further update a distribution list. For example, each morning an email containing information regarding all status types may be automatically sent or may be manually sent using the status drop down menu 96, where the email is automatically generated. To add or modify the recipient of the automated procurement status email, a user may click on a "Distribution List" selection of the status drop down menu 96 and insert or delete the person's email address. Furthermore, a hyperlink to the buyers for each line item is part of the spreadsheet such that clicking on the hyperlink will automatically generate an email to the buyer that includes all of the pertinent information regarding the line item of the spreadsheet.

Example categories of the status drop down menu 96 include, for example, unreleased demands (dependent demands that are originating from drawings and that have not been assigned to a buyer), released purchased requisitions that are awaiting purchase order placement (assigned to a buyer), unreleased purchase order line items (PO has been sent to supplier but the supplier has not acknowledged the order), held purchase order line items (items placed on hold either due to the supplier or internal issues), purchase order line items due for delivery (within x days), past due purchase order line items due for delivery, non-delivery items, received items (within x days), and/or open non-good receipt items.

The automated email and choices of the status drop down menu 96 provide the benefits of wide distribution of current information to key stakeholders and thus reduces the need for status meetings, allows key stakeholders to provide comments regarding any necessary changes (e.g., cancel, change, too late, etc.), which helps to keep the system accurate and up to date, and allows for a snapshot view of procurement status that facilitates prioritization of critical orders. For example, if a program manager sees that a date is not acceptable or if there is a delay in an item, the program manager may contact the buyer and have the buyer update the information in the appropriate system, for example, the EPS or the SAP system. Also, if information is missing the program manager may send the missing information to the buyer.

A data source drop down menu 98 is also capable of refreshing data fields linked to the EPS database 12 and the SAP reports 14, viewing connections and making any changes to SQL queries, checking for any newly logged items and re-aligning any manually entered data, updating EPS buyers and employees, viewing additional worksheets and/or resetting conditional formatting. When syncing the updated worksheets and data fields, the data source drop down menu 98 may show, for example, a "duplicate" worksheet, check for any differences, newly added products, statuses, changes in EODD, etc. The duplicate worksheet is updated to match a tracking worksheet and reapplies conditional formats on all worksheets, hides the duplicate worksheet, updates the metrics and the network status graphs, and a status update is returned.

The data source drop down menu 98 is capable of importing business warehouse and optional SAP reports that are needed to update data in the spreadsheet, updating GSC buyers, viewing additional worksheets, and/or resetting conditional formatting. The data source drop down menu 98 is also capable of connecting and tracking orders placed via SAP from inception to final invoice in one convenient location, and is capable of consolidating: (1) open PR reports, (2) open PO reports, (3) a more detailed PR/PO status report, (4) business warehouse reports, (5) inventory/stockroom reports, (6) hard peg and/or soft peg movement reports, and (7) other cost information reports.

A filters drop down menu 100 of the ribbon 90 is capable of applying commonly used filters for SAP and EPS worksheets. For example, if a user wants to see open items (i.e., items not received or invoiced), all received items, etc., the user may click on the designated filter and the spreadsheet will update to display the information. A networks drop down menu 102 is capable of modifying program networks. A resources drop down menu 104 is capable of displaying checklists and dates of reports, displaying a current version and general information, and displaying a total number of code lines, and displaying reference information.

Figure 6A:
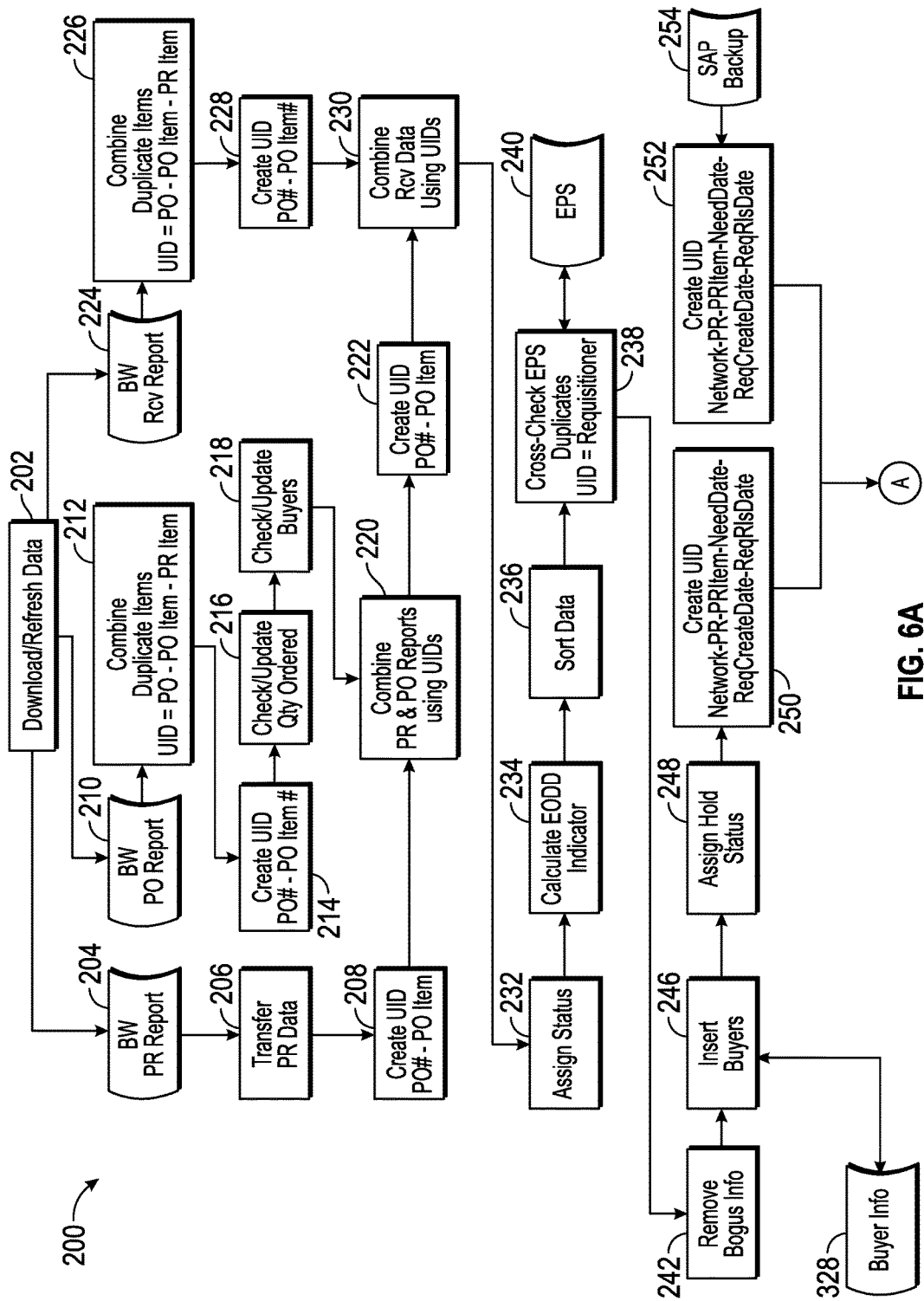
FIGS. 6A-6C are an illustration of an exemplary flow diagram showing how the material tracking system may be used.
Figure 6B:
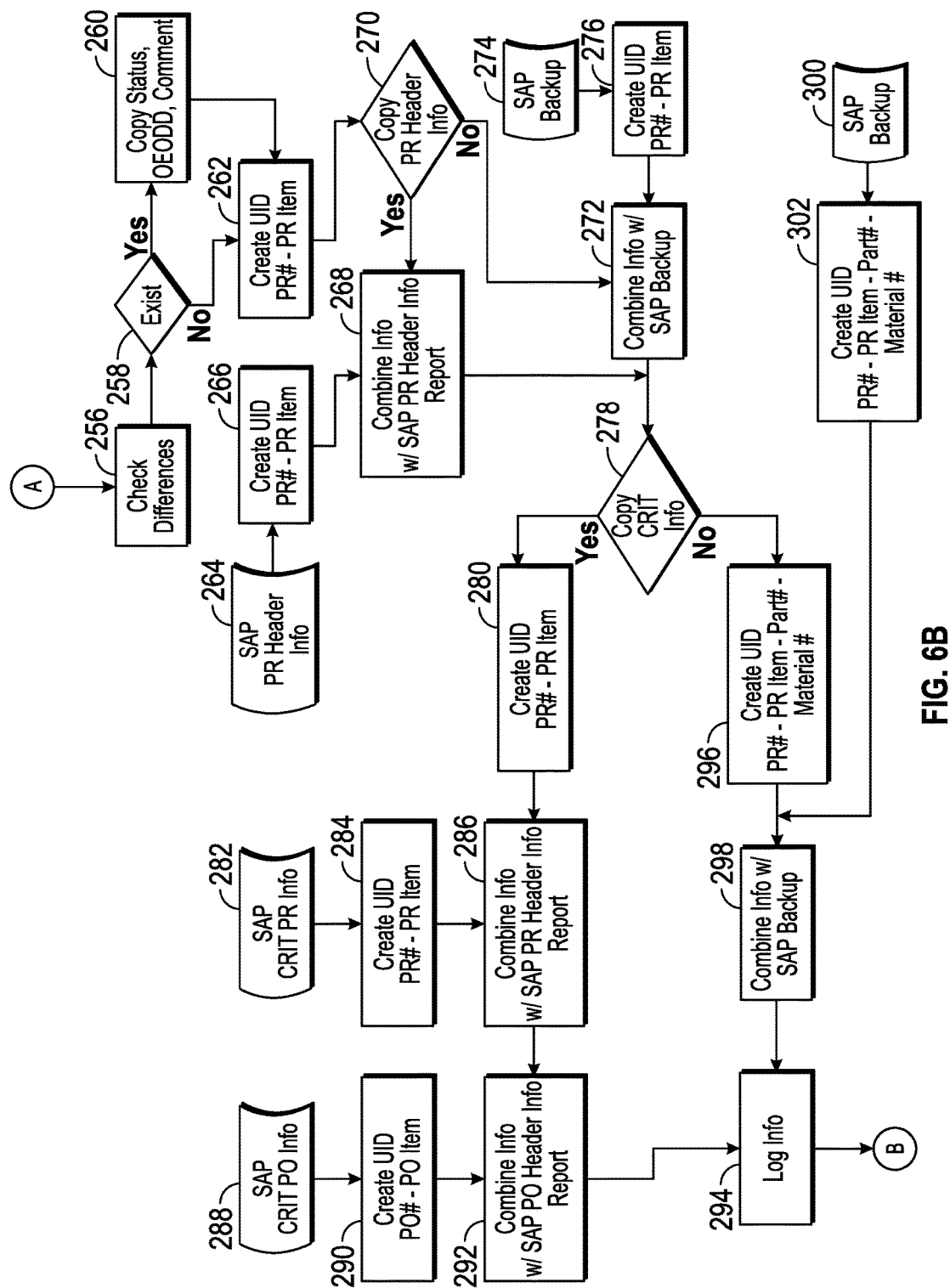
Figure 6C:
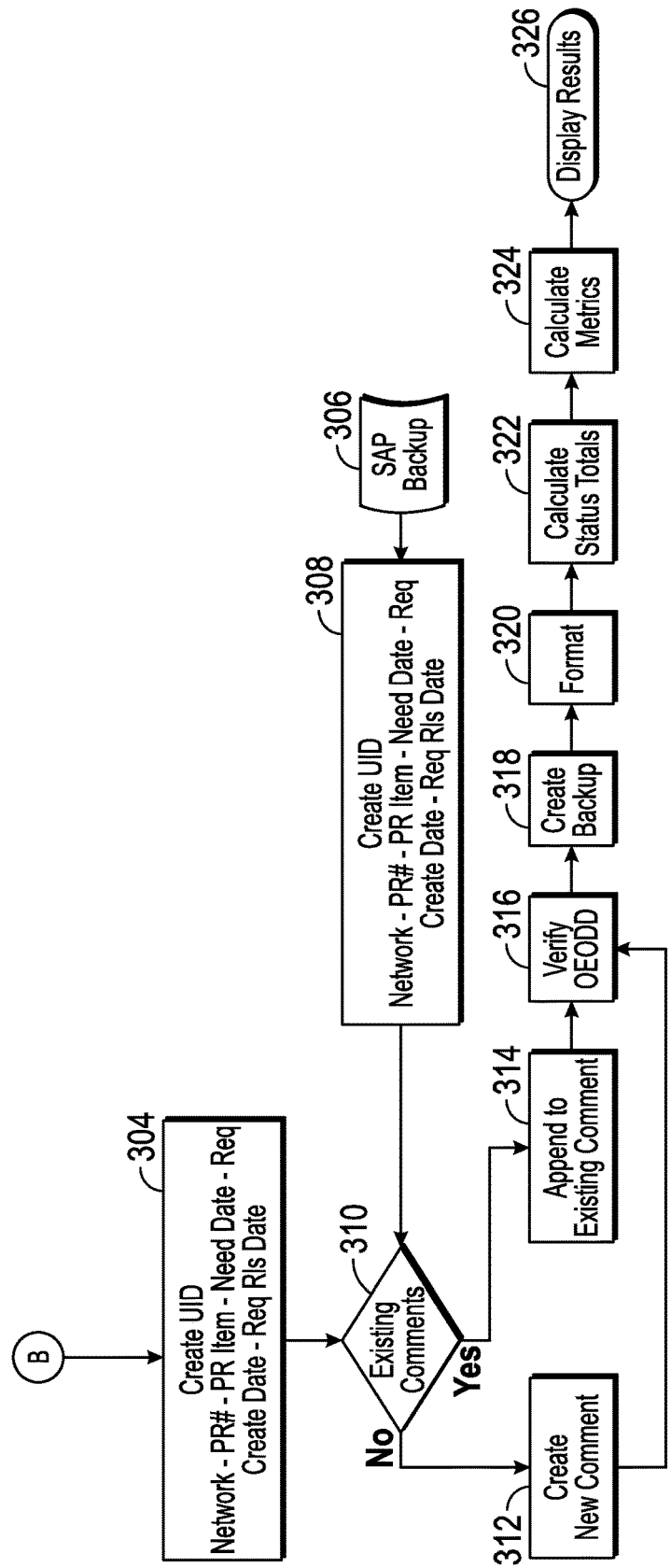

FIGS. 6A-6C are an illustration of an exemplary flow diagram showing how the material tracking system 10 may be used. Starting at box 202 in FIG. 6A, a user downloads and/or refreshes reports such as the eight reports shown in the box 42 of FIG. 3. For example, the PR report at box 204, the PO report(s) at box 210 and the Receive report(s) at box 224 are updated and refreshed upon the user initiating the refresh/download at the box 202. To refresh the data of the reports at the box 202, a user may accomplish this by clicking on the data source drop down menu 98 of the custom ribbon 90 shown in FIG. 5 (one of the choices of the drop down menu 98 includes updating the reports). At box 204, the PR report is refreshed and the data from the PR report is transferred into and opened in a suitable code language, e.g., Excel, as shown at the box 18 of FIG. 1. Next, a unique identifier (UID) that is going to be used for combining the data from the PR report to one or more PO reports is selected at box 208. The UID is chosen from information that is both the PR report and the PO report(s) that are to be merged. In this example, the PR report and PO report(s) both include a PO number and a PO item for each line item, thus these two parameters are used for the UID. The UID created at the box 208 corresponds to the box 62 of FIG. 4.

At box 210 the refreshed PO reports are combined at box 212 using a data that is common among the PO reports, such as PO number and PO item as stated above, such that a UID is created using PO number and PO item at box 214. The UID at the box 214 corresponds to the UID at the box 64 shown in FIG. 4. Once the UID is created at the box 214, the quantity ordered for each line item is checked and updated for the combined PO reports at box 216 and buyers for each line item are checked and updated for the combined PO reports at box 218. Next, the combined PO reports are merged/combined with the PR report using the corresponding UIDs from the boxes 208 and 214 at box 220. The box 220 corresponds to the box 66 of FIG. 4. Thus, the data for each line item is merged such that each line item has expanded columns in one combined report as discussed above. If there is any information in a report that does not match the UIDs, for example, a PO number is entered incorrectly, that data is ignored/not included when the reports are merged. The combined and merged data at the box 220 is assigned a UID at box 222 that uses identifying data that is found in each line item, e.g., PO number and PO item, as stated above.

Similarly, the refreshed/updated data from the Receive report(s) at the box 224 are combined at box 226 using a UID that is common among the Receive reports, for example, PO number, PO item and PR item. The UID is created at box 228 for each receive report and corresponds to the UID of the box 68 in FIG. 4. Because these reports also use PR item, the data is specified/narrowed such that the algorithm may catch any lost data from PO reports caused by inaccuracies and/or overlap in PO number or PO item. The UID created at the box 228 overlaps with the UID of the reports at the box 222 that the receive reports are to be combined with. In this example, the Receive reports are to be merged/combined with the combined PR and PO reports, which use a UID that is associated with PO number and PO item. Thus, the UID created for the Receive reports at the box 228 also uses PO number and PO item. The data chosen for the UID is merely exemplary in nature, as any information that is common among reports to be merged/combined may be used as a UID according to the system 10. Using the UID created at the boxes 222 and 228, the combined PR and PO reports are combined/merged with the combined Receive reports at box 230. The combined report at the box 230 corresponds to the UID of the box 70 in FIG. 4.

A status for each line item is assigned at box 232 that may include, for example, whether or not the line item is received, received in part, on hold, cancelled, placed, past due, etc. Depending on status, a predetermined visual aid may be provided with the status. For example, line items that are past due may be highlighted in red. Any predetermined visual aid suitable for the algorithm may be used to draw attention to a desired status. Next, an expected on dock date (EODD) is calculated and indicated at box 234 using a predetermined indicator that, for example, subtracts a revised EODD from a current EODD. Next, data from the combined reports at the box 230 is sorted at box 236 in a predetermined manner.

EPS data is also refreshed and imported into the chosen programming language, e.g., Excel, at box 240. The EPS data from the box 240 is cross-checked for duplicates and assigned a UID according to a requisitioner/charge number at box 238, and the EPS data is merged with the combined reports of the box 230 discussed above. The UID created at the box 238 corresponds to the box 72 of FIG. 4. While the requisitioner/charge number is the UID used in this example, let it be known that any data that is common among the reports to be merged may be used. Once the reports from the box 230 are combined with the EPS data from the box 240 at the box 238, bogus/duplicate information is removed at box 242. Buyer information from a box 328 is inserted with the appropriate line item at a box 246. Any appropriate buyer information may be used, for example, name, email, etc. Furthermore, if any excess buyer information is present such information may be removed by the algorithm.

Next, a check is done to see if any other hold statuses are present at box 248. At box 250, a new UID is created that uses, for example, network, PR item, need date, requisition create date, and requisition release date, at box 252. A SAP backup report from a box 254 that is a previous version of the data from the combined reports previously run in the past is created that uses data for a UID that is the same as the data for the UID that was created at box 250 such that the combined reports at the box 250 may be compared to the SAP backup report of the box 254 to determine any changes/differences between them. Starting at box "A" of FIG. 6B, differences between the report from the box 250 and the SAP backup report at the box 252 are checked and ascertained at box 256. The algorithm of the system 10 determines if differences exist at a decision diamond 258. If yes, a copy of the status, original expected on dock date (OEODD), and comments are provided at box 260. A copy of any desired information may also be provided for the appropriate line item of the combined reports to alert a user of differences between the line item data of the boxes 250 and 252. If no differences are found, and also at the point after comments are provided at the box 260, a new UID is created for the combined reports at box 262 that uses, for example, PR number and PR item. SAP PR header information from a box 264, which may or may not be refreshed, is provided with a UID that is created at box 266 that corresponds to the box 76 of FIG. 4, where the UID created at the box 266 matches the UID created at the box 262, e.g., PR number and PR item. The algorithm determines whether a copy of the PR header information is desired at decision diamond 270. If yes, the data from the boxes 262 and 264 are combined such that PR header information is included with the appropriate line item. If no, the data with the UID from the box 262 is combined with SAP backup data at box 272. The SAP backup data is from box 274 and is retrieved from data previously run in the past. For example, if a user previously ran the reports and updated the data using the algorithm on Dec. 8, 2014, and then the user does it again on Dec. 15, 2014, the information in the backup SAP is the data from Dec. 8, 2014. The SAP backup data is provided with a UID that is created using PR number and PR item, i.e., the same data used for the UID from the box 262, at box 276. The decision at the decision diamond 270 may be a manual choice that is made by a user or may be part of the algorithm where the algorithm determines whether SAP PR header information has been downloaded.

Next, the algorithm determines if a copy of CRIT info is desired at decision diamond 278. This may be a manual choice that is made by a user or may be part of the algorithm, where the algorithm determines if SAP CRIT PO information and/or SAP CRIT PR information has been downloaded. If the decision is yes, a UID for the SAP CRIT PR information from box 282 is created at box 284 that corresponds to the box 78 of FIG. 4, where the UID uses, for example, PR number and PR item. Any information that is common to the line items of the SAP CRIT PR information and the combined report from the boxes 268 and/or 272 may be used. At box 280, the same UID that is used at the box 284 for the SAP CRIT PR information is used for the combined reports from the boxes 268 and/or 272 such that the data may be combined at box 286. Next, SAP CRIT PO information from box 288 is provided with a UID that is created using data of line items that is common to both the SAP CRIT PO information and the combined report at the box 286 and that corresponds to the box 80 of FIG. 4. In this example, PO number and PO item are the common data items used for the UID. The data from the SAP CRIT PO information with the UID at box 290 and the combined report at the box 286 are combined at box 292.

If a copy of CRIT information is not desired at the decision diamond 278, a UID is created for the combined reports from the box 268 and/or 272 that uses, for example, PR number, PR item, part number and material number at box 296. Data from an SAP backup at box 300 is also provided a UID that is created at box 302 using PR number, PR item, part number and material number. The data/combined reports from the box 296 and the box 302 are combined at box 298 to create a combined report with SAP backup information. At this point, the algorithm is not backing up the entire SAP, but is instead taking data from a backup of only the columns containing CRIT information. This is done only if the user does not want to update the data from the CRIT report at this time. Thus, instead the algorithm only updates CRIT data from the previous report.

At box 294, any information that is copied from the box 292 and/or information from the box 298 is logged at box 294. The purpose of logging the information is to keep a running comment field such that the user can see if any of the information or comments has changed. If the user hovers over an appropriate cell of the spreadsheet, a comment box with appear with relevant historical data/comments. Next, starting from "B" on FIG. 6C, a new UID is created at box 304 that includes, for example, network, PR number, PR item, need date, requisition create date and requisition release date. To check for comments, e.g., any change related comments or new comments, information from an SAP backup at box 306 is provided with the same UID as in the box 304 is created at box 308, and the algorithm compares the data from the box 304 to the box 308 to determine if there are existing comments at decision diamond 310. If there are any existing comments from the box 308, new comments, if any, from the box 304 are appended to the existing comments such that a user can see all historical comments associated with a line item by, for example, right clicking on a line item. If there are no existing comments for a line item at box 308 and there are comments for the same line item at box 304, as determined at the decision diamond 310, a new comment is created for the line item at box 312.

Once all the comments are appropriately created and organized at the boxes 312 and 314, the original estimated on dock date (OEODD) is verified at box 316, a backup is created at box 318 by overwriting/creating an updated backup page, and the data is formatted at box 320. Once formatted at the box 320, status totals may be calculated at box 322 and metrics may be calculated at box 324. The results may be displayed at box 326 in a variety of ways, as described above. For example, graphs may be updated based on totals/metrics.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for combining data from multiple reports into a single spreadsheet, said method comprising:
   downloading at least two reports to a computing device;
   opening the at least two reports using the computing device;
   creating unique identifiers for each report, where each unique identifier is created with combinations of data fields in each of the at least two reports that are common to the at least two reports; and
   merging the at least two reports by mapping and combining relevant data and the unique identifiers into the single spreadsheet such that each line item in the spreadsheet includes the relevant data from the at least two reports, where the single spreadsheet has a unique identifier created from data fields which are found in each line item in the single spreadsheet.

2. The method according to claim 1 wherein the at least two reports are downloaded from an electronic procurement system, a sourcing and procurement system, business warehouse reports, parts approved supplier lists, or some combination thereof.

3. The method according to claim 1 wherein the at least two reports are opened in a suitable code language.

4. The method according to claim 3 wherein the suitable code language is Visual Basic™.

5. The method according to claim 1 wherein downloading the at least two reports includes manually downloading, automatically downloading, or a combination thereof.

6. The method according to claim 1 wherein creating unique identifiers for each report includes using data fields of the at least two reports that contain information that is not likely to change over time.

7. The method according to claim 1 further comprising creating a backup of the merged reports to check for status changes.

8. The method according to claim 7 further comprising flagging data that is formatted from a report from a predetermined system, to flag status changes, or a combination thereof.

9. The method according to claim 1 further comprising providing a graphic user interface pop-up upon double clicking a cell in the spreadsheet, wherein the graphic user interface provides predetermined information that is associated with the cell.

10. The method according to claim 1 further comprising providing a custom ribbon as part of the spreadsheet that includes metrics, forecasting, status, data source, filters, networks and resources drop down menu choices that are capable of providing various actions and data displays for the spreadsheet, communicating information in the spreadsheet, or a combination thereof.

11. A computing system for combining data from multiple reports into a single spreadsheet, said system comprising:
a processor programmed to:
download at least two reports to the computing system;
open the at least two reports in a suitable code language of the computing system;
create unique identifiers for each report, wherein each unique identifier is created with combinations of data fields in each of the at least two reports that are common to the at least two reports;
merge the at least two reports by mapping and combining the data associated with the unique identifiers into a single spreadsheet such that each line item in the spreadsheet includes relevant data from the at least two reports, where the single spreadsheet has a unique identifier created from data fields which are found in each line item in the single spreadsheet;
compare the single spreadsheet to a previous version of the single spreadsheet; and
flag any changes between the single spreadsheet and the previous version of the single spreadsheet such that a user of the system is able to quickly identify the changes.

12. The system according to claim 11 wherein the at least two reports are downloaded from an electronic procurement system, a sourcing and procurement system, business warehouse reports, parts approved supplier lists, or some combination thereof.

13. The system according to claim 11 wherein the suitable code language is Visual Basic™ and the single spreadsheet is an Excel spreadsheet with a custom ribbon.

14. The system according to claim 11 wherein the unique identifiers that are created for each report include data from fields of the at least two reports that is not likely to change over time.

15. The system according to claim 11 further comprising a graphic user interface pop-up that is generated upon double clicking a cell in the spreadsheet, wherein the pop-up provides predetermined information that is associated with the cell.

16. A computing system for combining data for multiple reports into a single spreadsheet, said system comprising:
a processor programmed to:
download at least two reports to the computing system;
open the at least two reports in a suitable code language;
create unique identifiers for each report, wherein each unique identifier is created with combinations of data in each of the at least two reports that is found in each of the at least two reports; and
merge the at least two reports by mapping and combining the data associated with the unique identifiers into a single spreadsheet such that each line item in the spreadsheet includes relevant data from the at least two reports, where the single spreadsheet has a unique identifier created from data fields which are found in each line item in the single spreadsheet.

17. The system according to claim 16 wherein the at least two reports are downloaded from an electronic procurement system, a sourcing and procurement system, business warehouse report, parts approved supplier lists, or some combination thereof.

18. The system according to claim 16 wherein the unique identifiers that are created for each report include data from fields of the at least two reports that is not likely to change over time.

19. The system according to claim 16 further comprising saving a backup of the merged reports that may be used to check for status changes when the reports are refreshed and re-merged, said changes being flagged to alert a user of changes.

20. The system according to claim 16 further comprising a custom ribbon that is part of the spreadsheet, said custom ribbon including metrics, forecasting, status, data source, filters, networks, and resources drop down menu choices that are capable of providing various actions and data displays for the spreadsheet, communicating information in the spreadsheet, or a combination thereof.

* * * * *